United States Patent
Ojima

(10) Patent No.: US 9,870,794 B2
(45) Date of Patent: Jan. 16, 2018

(54) MAGNETIC TAPE DEVICE AND MAGNETIC TAPE MAINTENANCE METHOD

(71) Applicant: NEC Platforms, Ltd., Kawasaki-shi, Kanagawa (JP)

(72) Inventor: Kenichi Ojima, Kawasaki (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 0 days.

(21) Appl. No.: 15/129,329

(22) PCT Filed: Mar. 26, 2015

(86) PCT No.: PCT/JP2015/059374
§ 371 (c)(1),
(2) Date: Sep. 26, 2016

(87) PCT Pub. No.: WO2015/151995
PCT Pub. Date: Oct. 8, 2015

(65) Prior Publication Data
US 2017/0178679 A1 Jun. 22, 2017

(30) Foreign Application Priority Data

Mar. 31, 2014 (JP) ................................ 2014-070898

(51) Int. Cl.
*G11B 15/00* (2006.01)
*G11B 15/18* (2006.01)
*G11B 15/43* (2006.01)

(52) U.S. Cl.
CPC .............. *G11B 15/18* (2013.01); *G11B 15/43* (2013.01); *G11B 15/00* (2013.01)

(58) Field of Classification Search
None
See application file for complete search history.

(56) References Cited

U.S. PATENT DOCUMENTS 2,560,254 A * 7/1951 Shickel .................. D06M 11/30
                                                              360/130.1
2,975,242 A * 3/1961 Fischer .................. G11B 15/12
                                                              242/354.2
(Continued)

FOREIGN PATENT DOCUMENTS

JP    62114149 A  *  5/1987
JP    04360011 A  * 12/1992
(Continued)

OTHER PUBLICATIONS

International Search Report and Written Opinion dated Apr. 21, 2015, in corresponding PCT International Application.

*Primary Examiner* — Will J Klimowicz
(74) *Attorney, Agent, or Firm* — Finnegan, Henderson, Farabow, Garrett & Dunner, L.L.P.

(57) ABSTRACT

A magnetic tape device includes a magnetic tape as a storage medium; a travel unit that moves the magnetic tape along a travel route; a magnetic head that is arranged at the travel route and performs data reading and writing for the magnetic tape that moves on the travel route; and a lifter unit that is arranged at the travel route and contacts the magnetic tape which is stopped on the travel route, where the lifter unit is able to reciprocate in a direction that intersects the travel route so as to separate the magnetic tape from the magnetic head.

4 Claims, 5 Drawing Sheets

(56) References Cited

U.S. PATENT DOCUMENTS

| | | | | |
|---|---|---|---|---|
| 4,426,750 A * | 1/1984 | Ariniello | G11B 23/502 | 15/256.5 |
| 4,656,534 A * | 4/1987 | Emmerich | G11B 5/008 | 360/71 |
| 7,558,021 B2 * | 7/2009 | Schuman | G11B 5/41 | 360/128 |
| 7,782,567 B2 * | 8/2010 | Biskeborn | G11B 5/41 | 360/128 |
| 8,159,776 B2 * | 4/2012 | Fujita | G11B 5/54 | 360/95 |
| 8,218,265 B2 * | 7/2012 | Bortz | G11B 15/43 | 360/130.21 |
| 9,058,836 B2 * | 6/2015 | Anderson | G11B 15/43 | |
| 2001/0012169 A1 * | 8/2001 | Kobayashi | G11B 15/20 | 360/72.3 |
| 2007/0064340 A1 | 3/2007 | Holmberg et al. | | |
| 2007/0247754 A1 * | 10/2007 | Schuman | G11B 5/41 | 360/128 |
| 2008/0259490 A1 * | 10/2008 | Fujita | G11B 5/54 | 360/77.12 |
| 2009/0225462 A1 * | 9/2009 | Ojima | G11B 15/026 | 360/31 |
| 2010/0039731 A1 * | 2/2010 | Bortz | G11B 15/60 | 360/130.21 |

FOREIGN PATENT DOCUMENTS

| | | | |
|---|---|---|---|
| JP | 8-96438 | 4/1996 | |
| JP | 08235823 A * | 9/1996 | |
| JP | 08273250 A * | 10/1996 | |
| JP | 11328633 A * | 11/1999 | G11B 15/67 |
| JP | 2009-211754 | 9/2009 | |
| JP | 2009211754 A * | 9/2009 | G11B 15/026 |
| JP | 4782158 B2 * | 9/2011 | G11B 5/54 |
| JP | 2012216256 A * | 11/2012 | |
| JP | 2016095888 A * | 5/2016 | |

* cited by examiner

MAGNETIC TAPE DEVICE AND MAGNETIC TAPE MAINTENANCE METHOD

TECHNICAL FIELD

The present invention relates to a magnetic tape device and a magnetic tape maintenance method.

BACKGROUND ART

As a data storage device utilized to record large quantities of data, a magnetic tape device using a magnetic tape is known, for which "LTO (Linear Tape-Open)" is a representative standard.

Such a magnetic tape device has a structure in which after a cartridge that contains a magnetic tape wound on a reel is loaded into the magnetic tape device, the magnetic tape is pulled out from the cartridge so as to read and write data. The reading and writing of data is performed by running the magnetic tape while the magnetic tape contacts a magnetic head provided in the magnetic tape device.

While no data reading or writing of the magnetic tape is performed, the magnetic tape is stopped. If the state that the magnetic tape is stopped continues for a relatively long period of time, the magnetic tape is stuck to the magnetic head due to static electricity or the like. In such a state, the magnetic tape may not run normally. Accordingly, various attempts have been performed so as to release the stuck state before the magnetic tape runs again from its stopping state.

For example, Patent Document 1 discloses a magnetic tape device which has a magnetic head utilized to read and write data on a magnetic tape, a drive device that runs the magnetic tape, a release device that releases a contact state between the magnetic tape and the magnetic head, and an abnormality detecting device that detects the abnormality in the operation of the magnetic tape.

In the above magnetic tape device, when the abnormality detecting device detects an abnormal state such that the magnetic tape is stuck to the magnetic head, they are separated by the release device so that a normal state of the magnetic tape is restored.

PRIOR ART DOCUMENT

Patent Document

Patent Document 1: Japanese Unexamined Patent Application, First Publication No. 2009-211754.

DISCLOSURE OF INVENTION

Problem to be Solved by the Invention

However, the magnetic tape device disclosed in Patent Document 1 also has a driving source utilized to drive the release device that releases the contact state between the magnetic tape and the magnetic head. Therefore, the structure is complex, which increases the manufacturing cost and requires a space for installing the driving source.

In order to solve the above problem, an object of the present invention is to provide a magnetic tape device and a magnetic tape maintenance method, by which the contact state between the magnetic tape and the magnetic head can be released with a compact structure, without increasing the manufacturing cost.

Means for Solving the Problem

In order to solve the above problem, the present invention provides a magnetic tape device comprising:
a magnetic tape as a storage medium;
a travel unit that moves the magnetic tape along a travel route;
a magnetic head that is arranged at the travel route and performs data reading and writing for the magnetic tape that moves on the travel route; and
a lifter unit that is arranged at the travel route and contacts the magnetic tape which is stopped on the travel route, where the lifter unit is able to reciprocate in a direction that intersects the travel route so as to separate the magnetic tape from the magnetic head.

The present invention also provides a magnetic tape maintenance method by using a magnetic tape device that includes:
a magnetic tape as a storage medium;
a travel unit that moves the magnetic tape along a travel route;
a magnetic head that is arranged at the travel route and performs data reading and writing for the magnetic tape that moves on the travel route; and
a lifter unit that arranged at the travel route,
wherein the method comprises:
making the lifter unit contact the magnetic tape which is stopped on the travel route; and
separating the magnetic tape from the magnetic head by reciprocating the lifter unit in a direction that intersects the travel route.

Effect of the Invention

In accordance with the magnetic tape device and the magnetic tape maintenance method of the present invention, increase in the manufacturing cost can be prevented and a compact structure of the device can be implemented.

MODE FOR CARRYING OUT THE INVENTION

Below, a magnetic tape device 100 as a first embodiment of the present invention will be explained with reference to FIGS. 1 to 5.

Figure 1:
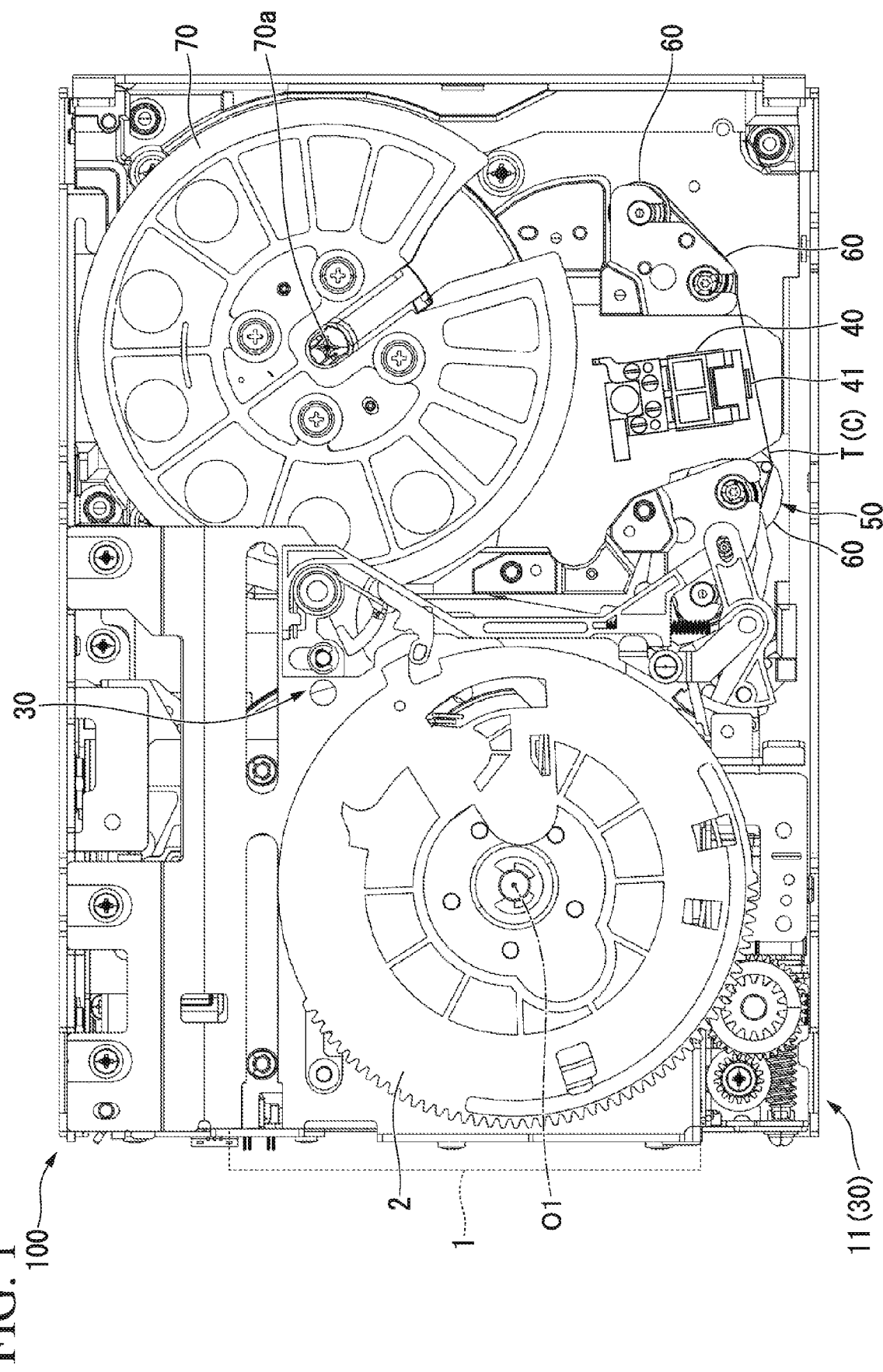
FIG. 1 is a plan view of a magnetic tape device as a first embodiment of the present invention.

As shown in FIG. 1, the magnetic tape device 100 is utilized as an external storage device when a cartridge 1, which contains a magnetic tape T, is loaded into the device 100.

The magnetic tape device 100 has a travel unit 30 that pulls out the magnetic tape T contained in the cartridge 1 and moves the magnetic tape T along a travel route C explained later; a magnetic head 40 that performs data reading and writing for the magnetic tape T run by the travel unit 30; and a lifter unit 50 by which when the magnetic tape T is stuck to the magnetic head 40, the magnetic tape T is separated from the magnetic head 40.

The structure of the travel unit 30 will be explained with reference to FIG. 2. In the following explanation, rotating shafts O1, O2, O3, and O4 extend along an arrow U-D in FIG. 2.

Figure 2:
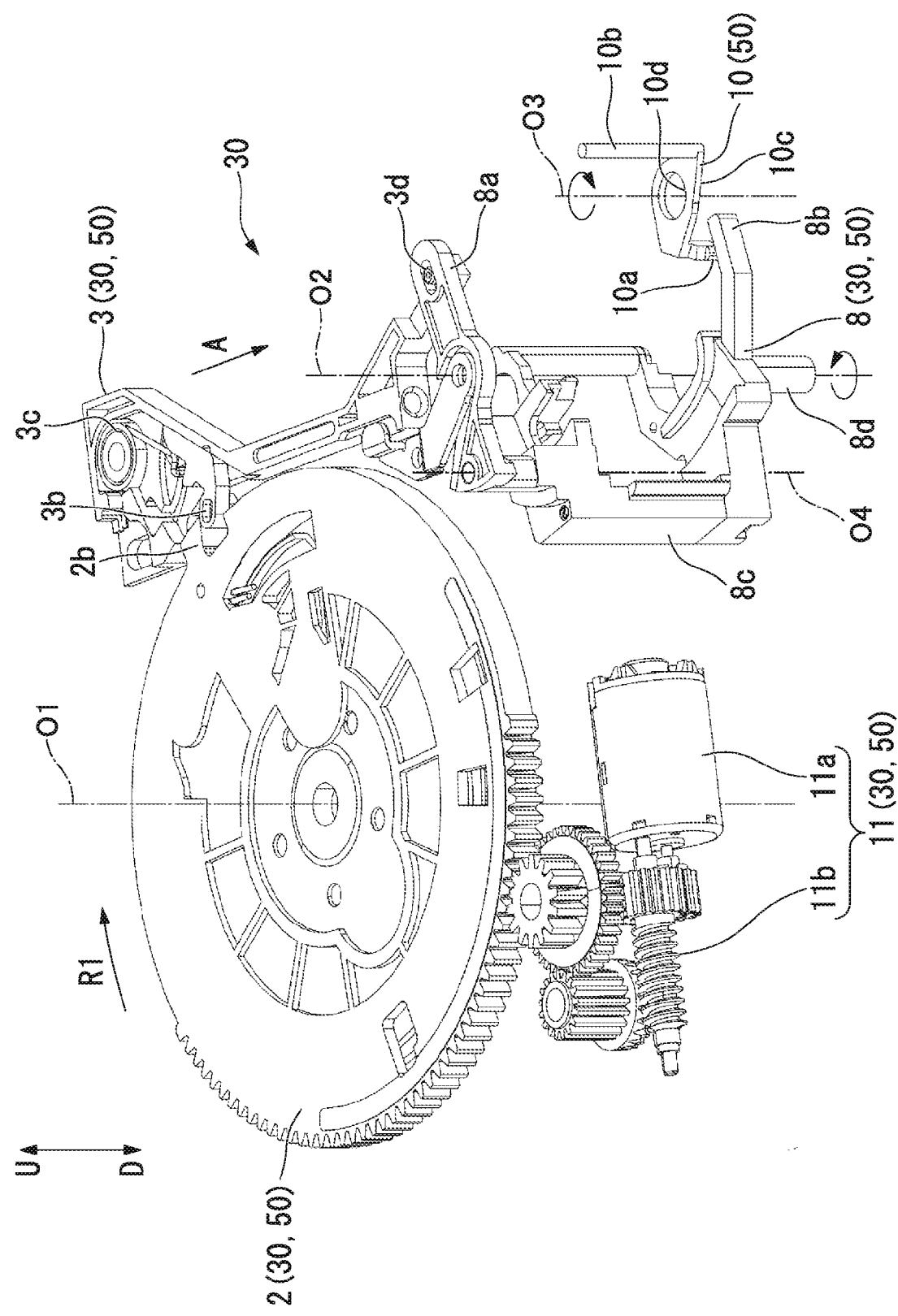
FIG. 2 is a perspective view that shows the structure of the travel unit and the lifter unit in the embodiment.

As shown in FIG. 2, the travel unit 30 has a loader gear 2 which is a gear rotatably supported around the rotating shaft O1; a drive device 11 that rotationally drives the loader gear 2; a rod bar 3 that performs a linear motion according to the rotation of the loader gear 2; a rotator 8 that rotates around the rotating shaft O2 (first rotating shaft) according to the linear motion of the rod bar 3; and a leader block 9 (see FIG. 3) detachably fit to the rotator 8.

In addition, as shown in FIG. 1, the travel unit 30 also has a plurality of rollers 60, each having a predetermined distance from the above-described magnetic head 40; and a winding reel 70 which is rotatable around a rotating shaft 70a.

The loader gear 2 is a member having a disc-shaped outer form, and teeth are formed at part of the outer periphery of the gear. In the part other than the part having the teeth in the outer periphery of the loader gear 2, a loader cam 2b is formed, which protrudes outward in a radial direction.

The drive device 11 has a motor 11a and a gear train 11b driven by the rotation of the motor 11a.

The motor 11a is electrically connected to a power supply (not shown). On the output shaft of the motor 11a, a gear is formed as a constituent of the gear train 11b.

The gear on the last stage of the gear train 11b is engaged with the above teeth of the loader gear 2. In other words, power output from the motor 11a is transmitted via the gear train 11b to the loader gear 2.

The rod bar 3 is a member having a generally rectangular outer shape. One end of the rod bar 3 has a cam groove 3b having a shape to be engaged with the loader cam 2b formed at the loader gear 2. That is, according to the rotation of the loader gear 2, the rod bar 3 can move linearly in a direction indicated by arrow A in FIG. 2.

This direction "A" is perpendicular to the above-described direction U-D. Therefore, the rod bar 3 can move linearly along a tangential direction of the outer periphery of the loader gear 2.

In addition, the rod bar 3 is forced by a spring 3c toward the back side of the direction A.

Furthermore, a shaft 3d is formed at an end of the rod bar 3, where the end is positioned at the front side of the direction A.

The rotator 8 is rotatably supported around the rotating shaft O2 provided on the magnetic tape device 100. More specifically, the rotator 8 consists of a rotator lever 8a that contacts the rod bar 3; a rotator arm 8b that faces the rotator lever 8a in a direction along the rotating shaft O2; and a connection part 8c that connects the rotator lever 8a and the rotator arm 8b in the direction of the rotating shaft O2.

A head part of the rotator lever 8a is connected to the shaft 3d provided at the rod bar 3. In addition, in the head part of the rotator lever 8a, a hole is formed which is elongated along a direction in which the rotator 8a extends. The shaft 3d is inserted into the opening of this elongated hole.

The rotator arm 8b is a part of a member having a Y-shaped outer form. This member has a shaft 8d supported by the rotating shaft O2. From the region where the shaft 8d is provided, three rod-shaped arms extend in a substantially radial manner. One of the three arms is the rotator arm 8b.

One end of the rotator arm 8b in a direction away from the shaft 8d is arranged to contact a lifter unit main body 10 of the lifter unit 50 explained later.

The rotator lever 8a and the rotator arm 8b as formed above are connected to each other by a connection part 8c in a direction along which the rotating shaft O2 extends. The connection part 8c is provided away from the rotating shaft O2 by a predetermined distance in a radial direction so that there is a space between the rotator lever 8a and the rotator arm 8b. In this space, the leader block 9 is detachably arranged by a locking part (not shown).

The leader block 9 (see FIG. 3) is a member having a rectangular-parallelepiped outer shape. Although detailed parts are not shown, the leader block 9 has an engaging groove (not shown) utilized to engage with a rod-shaped leader pin provided at the start end of the magnetic tape T in the cartridge 1.

In synchronism with the movement of the rod bar 3 toward the direction A, the leader block 9 rotates around the rotating shaft O4 together with the rotator arm 8b. According to this rotation, the engaging groove of the leader block 9 engages with the leader pin provided at the magnetic tape T.

After the leader block 9 is engaged with the leader pin, it moves along the predetermined travel route C (explained later in detail) so that the magnetic tape T connected to the leader pin is pulled out from the cartridge 1 to be utilized for the data reading and writing or the like.

Each roller 60 is a column-shaped member which is rotatable around a predetermined rotating shaft. The rollers 60 are provided to apply an appropriate tension to the magnetic tape T so that the magnetic tape T has no bending or the like in the vicinity of the magnetic head 40 for the running of the magnetic tape T. That is, the magnetic tape T runs while it contacts the outer-peripheral surfaces of the rollers 60.

Figure 4:
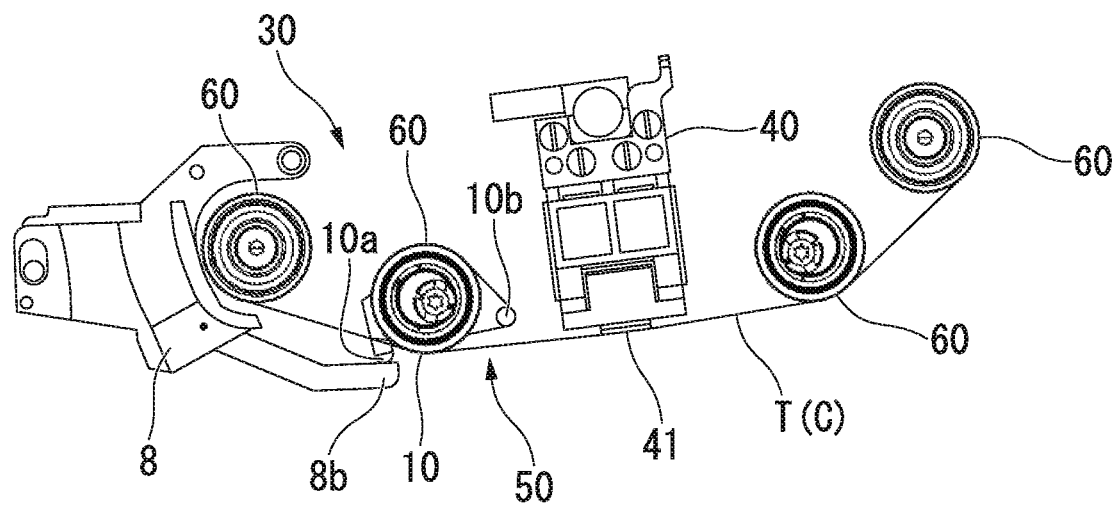
FIG. 4 is a diagram utilized to explain the operation of the lifter unit in the embodiment.

As shown in FIG. 4, the travel route C is a broken-line shape that is formed by connecting the outer-peripheral parts of the rollers 60 in the travel unit 30 and a reading surface 41 of the magnetic head 40.

The magnetic tape T runs along the travel route C by the travel unit 30. After the magnetic tape T runs the travel route C, the tape is wound up around the winding reel 70 (see FIG. 1).

Such an operation of moving a storage medium like the magnetic tape T, whose start end has a leader pin, along the travel route C in the magnetic tape device 100 is generally called a "sledding operation".

Figure 3:
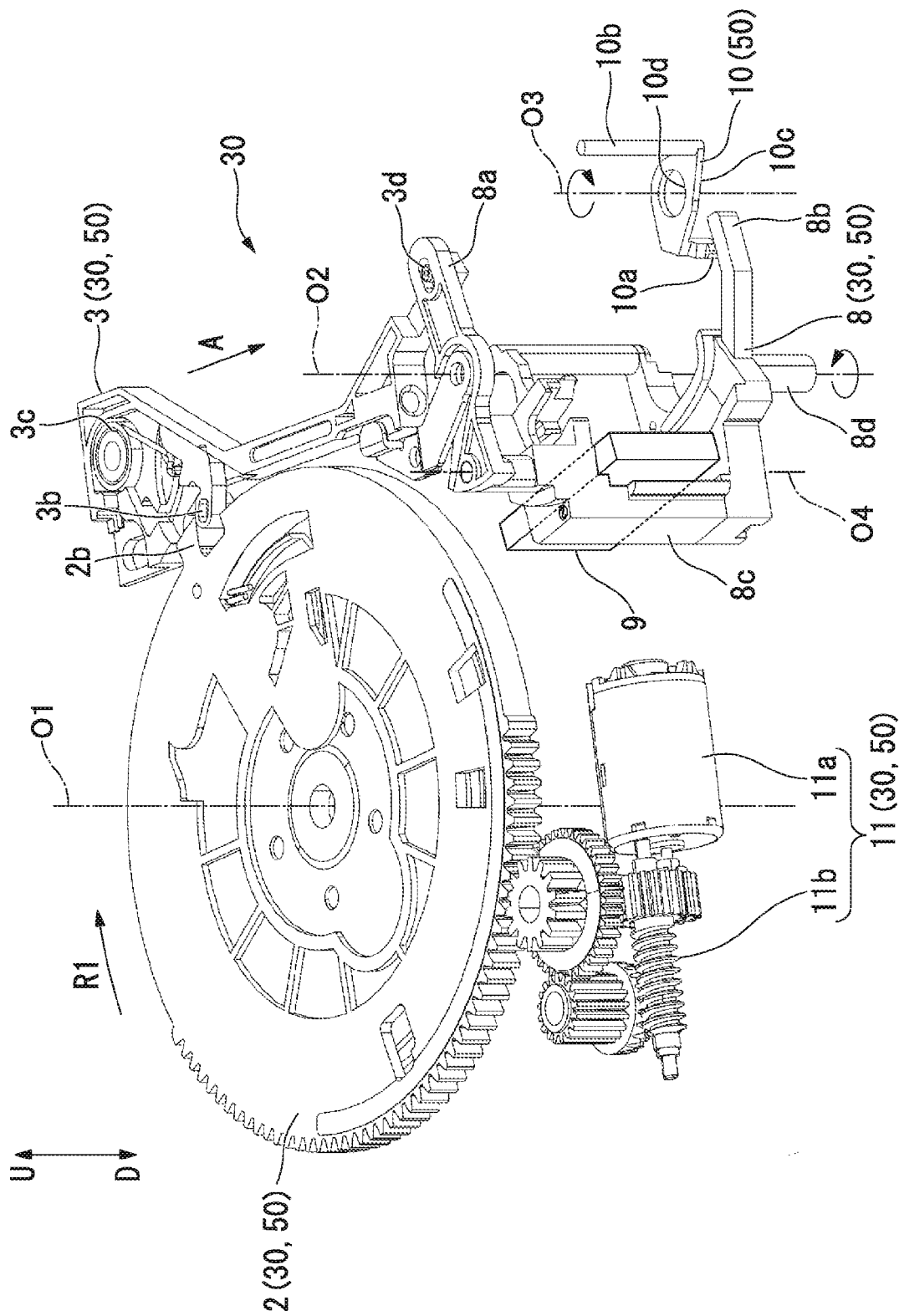
FIG. 3 is also a perspective view that shows the structure of the travel unit and the lifter unit in the embodiment.

After the leader block 9 is arranged in the space formed between the rotator lever 8a and the rotator arm 8b as described above, the leader block 9 moves along the travel route C by a driving source (not shown). That is, after the movement of the leader block 9, a state as shown in FIG. 3 is obtained.

The above sledding operation may be performed by a structure using a driving source, a follower driven by the driving source, and a cam which guides the follower. In such a structure, the follower is attached to the leader block 9 and the cam is formed to have a shape along the travel route C so that the follower follows the cam. Such a structure can move the leader block 9 along a desired travel route C.

Next, the structure of the lifter unit 50 will be explained with reference to FIG. 2.

The lifter unit 50 and the above-described travel unit 30 may have common structural elements. That is, the lifter unit 50 has the drive device 11 (drive unit), the loader gear 2, the rod bar 3, and the rotator 8. The lifter unit 50 also has the lifter unit main body 10.

Below, detailed explanations of the common structural elements are omitted, and the lifter unit main body 10 will be explained in detail.

As shown in FIG. 2, the lifter unit main body 10 is a member that contacts a head part of the rotator arm 8b of the rotator 8. The lifter unit main body 10 has a lifter lever 10a that contacts the rotator arm 8b; a lifter arm 10b (contact part) that extends in a direction along the rotating shaft O3 (second rotating shaft); and a lifter base 10c which connects these members.

The lifter base 10c has a plate and substantially rectangular outer shape which extends on a surface which intersects the rotating shaft O3. A circular opening 10d is provided in a middle area of the lifter base 10c and passes through the lifter base 10c in the thickness direction thereof.

The opening 10d is supported by a shaft (not shown) provided at the magnetic tape device 100 so as to be able to rotate around the rotating shaft O3. Furthermore, this shaft is forced by a spring (not shown). More specifically, the shaft is forced so as to rotate around the rotating shaft O3 in the counterclockwise direction when viewed from a first side of the direction U-D.

The lifter lever 10a is a protruding part provided at an end of the lifter base 10c. The lifter arm 10b is a rod member provided at an opposed end (for the above end) of the lifter base 10c.

The lifter arm 10b extends from the lifter base 10c in a direction along the rotating shaft O3 and is provided on a surface opposed to a surface on which the lifter lever 10a is provided. The size of the lifter arm 10b in its extending direction is greater than the size of the magnetic tape T in the width direction thereof.

When no force is applied from the rotator 8, the lifter unit main body 10 is stopped by the force of the spring in a manner such that the lifter arm 10b is separated from the travel route C. This position is determined to be an initial position of the lifter unit main body 10 (i.e., the lifter arm 10b). More specifically, as shown in FIG. 4, in the initial position, the lifter arm 10b is separated from the travel route C toward the side where the magnetic head 40 is located.

The travel unit 30 and the lifter unit 50 in the magnetic tape device 100 are constructed as described above.

Figure 5:
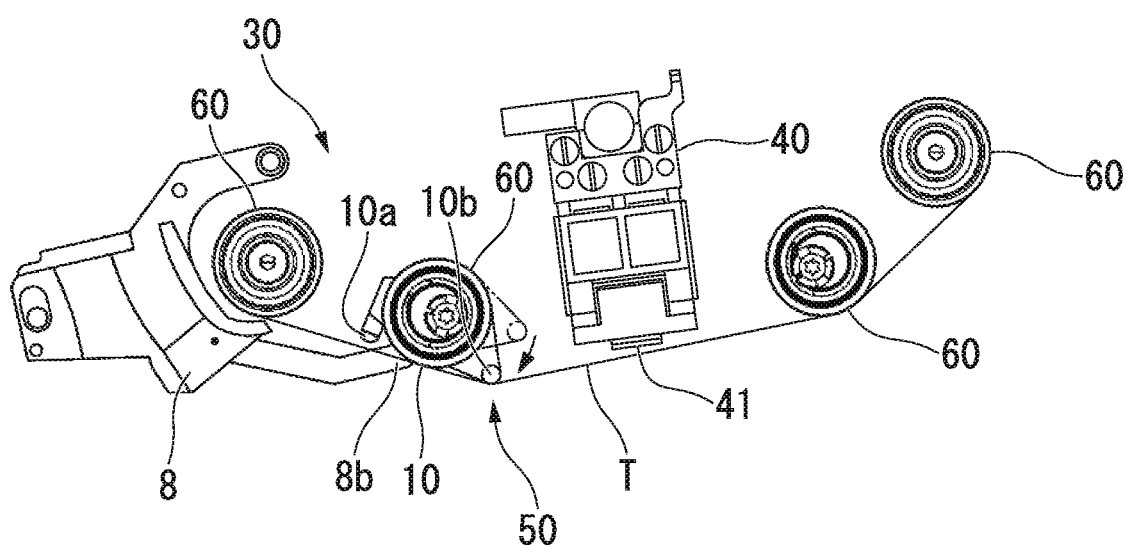
FIG. 5 is also a diagram utilized to explain the operation of the lifter unit in the embodiment.

Next, the operation of the lifter unit 50 in the magnetic tape device 100 will be explained with reference to FIGS. 3 to 5. Here, the lifter unit 50 operates after the above sledding operation by the travel unit 30 is completed.

First, the motor 11a of the drive device 11 is driven by the power supply (not shown) so that power output from the motor 11a is transmitted to the gear train 11b. According to the power transmitted to the gear train 11b, the loader gear 2 that is engaged with the gear train 11b rotates around the rotating shaft O1 in a direction indicated by "R1".

When the loader gear 2 rotates in the direction R1, the loader cam 2b provided at the loader gear 2 is engaged with the cam groove 3b formed at the rod bar 3. When the loader gear 2 further rotates in the engagement state of the loader cam 2b and the cam groove 3b, the rod bar 3 moves linearly in the direction indicated by arrow A in FIG. 3.

According to the movement of the rod bar 3, the rotator 8 rotates around the rotating shaft O2. More specifically, the rotator 8 rotates around the rotating shaft O2 in the counterclockwise direction when viewed from the first side of the U-D direction.

According to the rotation of the rotator 8, the lifter unit main body 10 rotates around the rotating shaft O3. More specifically, the lifter unit main body 10 rotates around the rotating shaft O3 in the clockwise direction when viewed from the first side of the U-D direction.

When the lifter unit main body 10 rotates around the rotating shaft O3 in the clockwise direction, the magnetic tape T located on the travel route C contacts the lifter arm 10b of the lifter unit main body 10. When the lifter unit main body 10 further rotates from the above state, the magnetic tape T moves to a position so as to deviate from the travel route C (see FIG. 5). This position is called a "lifting position" of the lifter unit main body 10 (i.e., lifter arm 10b).

In other words, according to the operation of the lifter arm 10b, the magnetic tape T moves substantially in its thickness direction and deviates from the travel route C. This operation is called a "lifting operation".

Next, the operation of the lifter unit 50 after the lifting operation is completed will be explained.

After the lifting operation is completed, the loader gear 2 further rotates, which release the engagement between the loader cam 2b of the loader gear 2 and the cam groove 3b of the rod bar 3.

After the engagement between the loader cam 2b and the cam groove 3b is released, the rod bar 3 moves toward the back side of the direction A by means of elastic restoring three of the above-described spring 3c.

Accompanied with the movement of the rod bar 3 toward the back side of the direction A, the rotator 8 rotates around the rotating shaft O2 in the clockwise direction when viewed from the first side of the U-D direction. Accordingly, the rotator arm 8b also rotates around the rotating shaft O2 in the clockwise direction when viewed from the first side of the U-D direction.

As described above, the lifter unit main body 10 that contacts the rotator arm 8b is forced by the spring (not shown) so as to rotate around the rotating shaft O3 in the counterclockwise direction when viewed from the first side of the U-D direction.

Therefore, in accordance with the clockwise rotation of the rotator 8 around the rotating shaft O2, the lifter unit main body 10 rotates around the rotating shaft O3 in the counterclockwise direction by means of elastic restoring force of this spring.

Accordingly, the lifter arm 10b of the lifter unit main body 10 moves to the initial position on the travel route C. Here, since the tension is applied to the magnetic tape T by the rollers 60 as described above, when the lifter arm 10b moves to the initial position, the magnetic tape T moves to the travel route C by its own tension and contacts the magnetic head 40 again. Therefore, the operation of data reading and writing or the like is performed on the magnetic tape T.

According to the above-described structure, when the magnetic tape T is on the travel route C, the magnetic tape T contacts the magnetic head 40. In contrast, when the lifter unit 50 performs the lifting operation, the magnetic tape T is separated from the magnetic head 40.

That is, even when the magnetic tape T is stuck to the magnetic head 40 due to static electricity or the like, such a state can be cancelled by the lifting operation of the lifter unit 50. Accordingly, the magnetic tape T can appropriately run on the travel route C and data reading and writing on the magnetic tape T can be appropriately performed by the magnetic tape device 100.

As explained above, the lifter unit main body 10 of the lifter unit 50 can be reciprocated between the above initial position and the lifting position.

Additionally, in accordance with the above structure, the lifter unit 50 and the travel unit 30 use the common driving source. That is, the lifter unit 50 is driven by the drive device 11 that drives the travel unit 30. Therefore, the lifter unit 50 can be implemented without providing a driving source other than the drive device 11. Accordingly, the number of parts of the device can be reduced and the manufacturing process can be simplified.

In addition, in the above structure, the size of the lifter arm 10b (contact part) of the lifter unit main body 10 is larger than the size of the magnetic tape T in its width direction. Therefore, the lifter arm 10b can contact the entire magnetic tape T in the width direction thereof.

If the lifter arm 10b is shorter than the width size of the magnetic tape T, the magnetic tape T may have a damage such as twisting or breaks according to the operation of the lifter unit 50 (i.e., lifter arm 10b).

However, according to the above structure, the lifter unit 50 of the present embodiment can operate without damaging the magnetic tape T.

Furthermore, according to the maintenance method of the magnetic tape T by using the lifter unit 50 as constructed above, the lifter unit 50 can be reciprocated between the above initial position and the lifting position, and thus the magnetic tape T can be separated from the magnetic head 40.

That is, even when the magnetic tape T is stuck to the magnetic head 40 due to static electricity or the like, such a state can be cancelled by operating the lifter unit 50. Accordingly, the magnetic tape T can appropriately run on the travel route C and data reading and writing on the magnetic tape T can be appropriately performed by the magnetic tape device 100.

Although the first embodiment of the present invention has been explained in detail with reference to the drawings, the individual structural elements and the combinations thereof in the embodiment are examples. Additions, omissions, substitutions, and other modifications can be made without departing from the scope of the present invention. Accordingly, the invention is not to be considered as being limited by the embodiment, and is only limited by the scope of the appended claims.

In the above embodiment, the magnetic tape T is contained in the cartridge 1. However, the form of the magnetic tape T is not limited to the cartridge type. For example, the present invention can be applied to a product (e.g., an open-reel deck) in which the magnetic tape T is exposed to the outside. In a broader sense, the present invention can be applied to any product which is a storage medium formed by coating a strip-shaped thin film with a magnetic substance.

Additionally, in the present embodiment, as the structure of the gear train 11b in the drive device 11, a worm gear provided at the output shaft of the motor 11a and two circular gears which engage with the worm gear are utilized. However, the structure of the gear train 11b is not limited to such a structure and any structure may be employed if rotation power of a motor or the like can be reduced and transmitted. For example, a belt and a pulley, or a gear and a chain may be employed.

Figure 6:
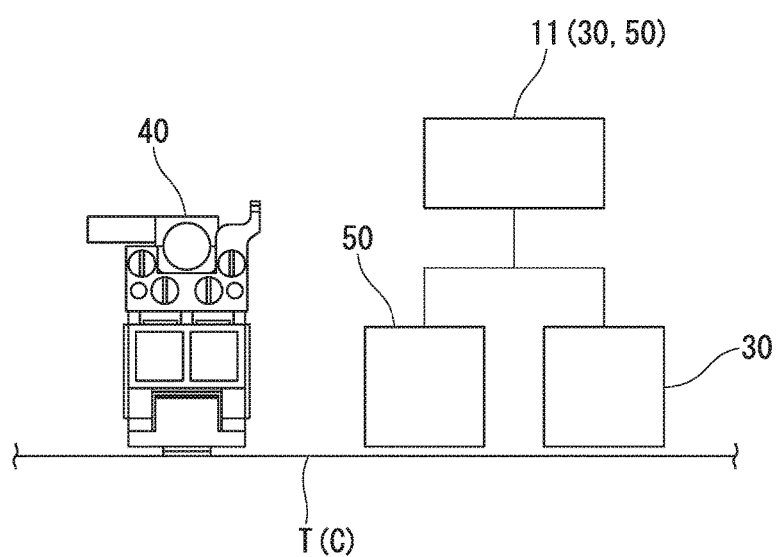
FIG. 6 is a diagram utilized to explain a magnetic tape device as a second embodiment of the present invention.

Next, a second embodiment of the present invention will be explained with reference to FIG. 6.

A magnetic tape device 200 of the present embodiment differs from the above first embodiment as described below.

That is, the magnetic tape device 200 of the present embodiment has a magnetic tape T which runs on a travel route C, a travel unit 30 that runs the magnetic tape T on the travel route C, a magnetic head 40 that contacts the magnetic tape T to perform data reading and writing, and a lifter unit 50 provided on the travel route C.

Even such a structure can obtain an effect similar to that obtained by the first embodiment. That is, even when the magnetic tape T is stuck to the magnetic head 40 due to static electricity or the like, such a state can be cancelled by operating the lifter unit 50. Accordingly, the magnetic tape T can appropriately run on the travel route C and data reading and writing on the magnetic tape T can be appropriately performed by the magnetic tape device 200.

Priority is claimed on Japanese Patent Application No. 2014-070898, filed Mar. 31, 2014, the contents of which are incorporated herein by reference.

INDUSTRIAL APPLICABILITY

In accordance with the present invention, increase in the manufacturing cost can be prevented and a compact structure of the device can be implemented.

REFERENCE SYMBOLS

T magnetic tape
C travel route
1 cartridge
2 loader gear
2b loader cam
3 rod bar
3b cam groove
3c spring
3d shaft
8 rotator
8a rotator lever
8b rotator arm
8c connection part
8d shaft
9 leader block
10 lifter unit main body
10a lifter lever
10b lifter arm (contact part)
10c lifter base
10d opening
11 drive device
11a motor
11b gear train
30 travel unit
40 magnetic head
50 lifter unit
60 roller
70 winding reel
70a rotating shaft
O1, O2, O3, O4 rotating shaft

The invention claimed is:
1. A magnetic tape device comprising:
a magnetic tape as a storage medium;
a travel unit including a rotator supported rotatably around a first rotating shaft and a drive unit, wherein the travel unit moves the magnetic tape along a travel route according to rotation of the rotator by a driving force from the drive unit;
a magnetic head that is arranged at the travel route and performs data reading and writing for the magnetic tape that moves on the travel route; and
a lifter unit that is arranged at the travel route and contacts the magnetic tape which is stopped on the travel route, where the lifter unit is able to reciprocate in a direction that intersects the travel route so as to separate the magnetic tape from the magnetic head, wherein the lifter unit includes:
the rotator; and
a lifter unit main body, one end of the lifter unit main body contacting the rotator and being supported rotatably around a second rotating shaft while the other end contacts the magnetic tape,
wherein the drive unit applies the driving force rotating the rotator and the rotator rotates the lifter unit main body.

2. The magnetic tape device in accordance with claim 1, wherein:
the lifter unit main body has a contact part that contacts the magnetic tape; and
in a width direction of the magnetic tape, the contact part has a size greater than that of the magnetic tape.

3. A magnetic tape maintenance method by using a magnetic tape device that includes a magnetic tape as a storage medium, the magnetic tape maintenance method comprising:
preparing a travel unit that includes a rotator supported rotatably around a first rotating shaft and a drive unit to move the magnetic tape along a travel route according to rotation of the rotator by a driving force from the drive unit;
preparing a magnetic head that is arranged at the travel route to perform data reading and writing for the magnetic tape that moves on the travel route;
preparing a lifter unit that is arranged at the travel route, the lifter unit including the rotator and a lifter unit main body, one end of the lifter unit main body contacting the rotator and being supported rotatably around a second rotating shaft while the other end contacts the magnetic tape,
wherein the drive unit applies the driving force rotating the rotator and the rotator rotates the lifter unit main body,
making the lifter unit contact the magnetic tape which is stopped on the travel route; and
separating the magnetic tape from the magnetic head by reciprocating the lifter unit in a direction that intersects the travel route.

4. The magnetic tape maintenance method in accordance with claim 3, further including:
providing the lifter unit main body with a contact part that contacts the magnetic tape; and
providing the contact part with a width, in a width direction of the magnetic tape, greater than a width of the magnetic tape.

* * * * *